United States Patent
Jodet et al.

[11] Patent Number: 6,126,891
[45] Date of Patent: Oct. 3, 2000

[54] SYSTEM FOR HIGH RATE COOLING FURNACE FOR METAL STRIPS

[75] Inventors: Gérard Jodet, Saint Maur; Jean-Jacques Nozieres, Chaville, both of France

[73] Assignee: Stein Heurtey, Ris-Orangis, France

[21] Appl. No.: 09/172,297

[22] Filed: Oct. 14, 1998

[30] Foreign Application Priority Data

Oct. 15, 1997 [FR] France .................................. 97 12907

[51] Int. Cl.⁷ .................................................. C21B 7/10
[52] U.S. Cl. .............................. 266/46; 266/111; 266/159
[58] Field of Search ..................... 266/102, 109, 266/111, 158, 159, 144, 46

[56] References Cited

U.S. PATENT DOCUMENTS

| | | | |
|---|---|---|---|
| 4,600,181 | 7/1986 | Falco et al. | 266/111 |
| 4,704,167 | 11/1987 | Ichida et al. | 266/109 |
| 5,472,528 | 12/1995 | Boyer | 266/111 |

FOREIGN PATENT DOCUMENTS 0 795 616 A1   9/1997   European Pat. Off. .

Primary Examiner—Scott Kastler
Attorney, Agent, or Firm—Pollock, Vande Sande & Amernick

[57] ABSTRACT

Rapid-cooling oven, forming part of a plant comprising various treatment stations, especially stations for the heat treatment of products in strip form, through which a metal strip runs continuously, the rapid cooling being obtained by spraying onto the strip a jet of an atmosphere gas consisting of a nitrogen/hydrogen mixture having a hydrogen content which is greater than 15%, and preferably close to 50%, the atmosphere gas being recirculated using a circuit of recirculation ducts comprising compensators made in the form of a series of corrugations allowing all the ducts to expand, at least one fan and at least one gas/water exchanger, wherein a safety device is provided to prevent this ingress of air into the circuit for recirculating the cooling gas or any leak of the latter into the environment, in the event of a break in a corrugation of a compensator or in the case of a leak form the latter, said safety device being made in the form of a flexible membrane impermeable to the cooling gas, the said membrane being placed around each of the compensators of the recirculation duct, a means being furthermore provided for immediately interrupting the flow of the cooling gas in its recirculation circuit.

12 Claims, 2 Drawing Sheets

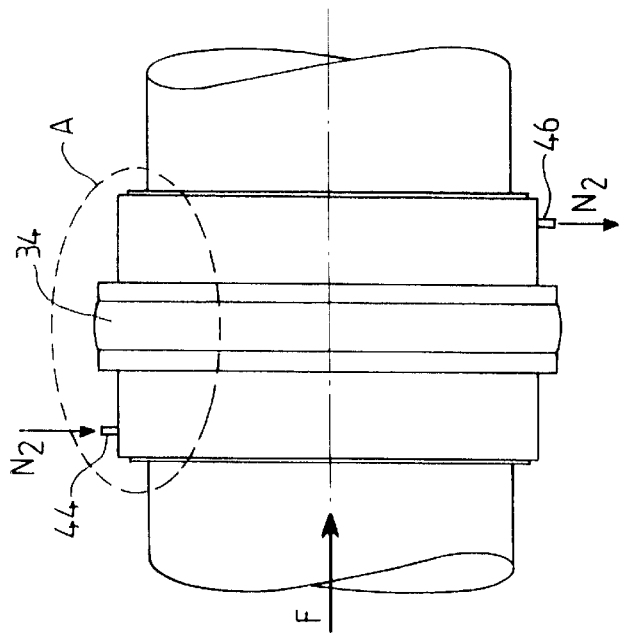
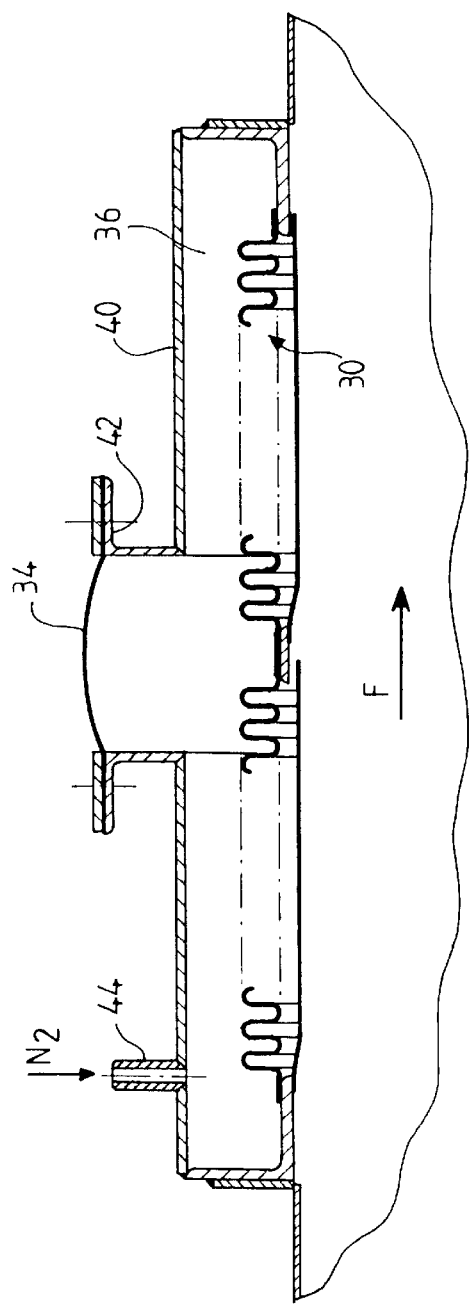
FIG. 2
FIG. 3
FIG. 4

SYSTEM FOR HIGH RATE COOLING FURNACE FOR METAL STRIPS

FIELD OF THE INVENTION

The present invention relates to the improvements made to rapid-cooling ovens for materials in strip form and more particularly for metal strip. These ovens may especially form part of plants for treatments such as, for example, heat treatments of metal products in strip form, especially those for galvanizing, for annealing, for tinplate production, etc.

The present invention relates more particularly to a safety system for such rapid-cooling ovens.

BACKGROUND OF THE INVENTION

Plants are known (EP-A-0,795,616) which are intended for the continuous heat treatment of metal strip, in which the strip to be treated travels through an oven consisting of a plurality of heat-treatment sections, especially heating sections, temperature-hold sections, annealing sections, cooling sections, etc. In this publication, the present proprietor has recommended the use of heating and/or cooling enclosures or chambers in which there is an atmosphere consisting of a hydrogen-based gas mixture, the hydrogen content of which is greater than the values usually permitted so as to increase the cooling rate. Thus, according to this prior technique, a gas mixture, especially a nitrogen/hydrogen gas mixture, having a hydrogen content which is greater than 15% and which may reach 50%, i.e. greater than the explosibility limit value for this gas, may be used as the atmosphere in the cooling enclosure.

In the cooling enclosure of the abovementioned plants, the recycled atmosphere gas is blown onto the continuously moving metal strip, after it has been cooled especially with the aid of gas/water heat exchangers, the composition of the atmosphere gas, and more particularly its high hydrogen content, making it possible to obtain very rapid cooling rates of the order of 100° C. per second. The plants therefore comprise a circuit of ducts for recirculating the $N_2$, $H_2$ atmosphere gas, one or more fans for continuously circulating this cooling gas in the recirculation ducts, and gas/water exchangers.

Given the very high hydrogen content of the atmosphere gas used during the rapid cooling, it is necessary to take great precautions to ensure that the plant is safe; indeed, a leak, however tiny, of the atmosphere gas into the environment cannot be tolerated, nor can ingress of air into the recirculation ducts.

The present invention aims to provide a solution to this safety problem, more particularly in the case in which all the cooling-gas circulation ducts have compensators which allow the ducts to expand. In the event of a break in a corrugation of a compensator, or of a leak in the latter, it is absolutely necessary to prevent the ingress of air, i.e., of oxygen, into the cooling-gas recirculation circuit or any leakage of this cooling gas into the environment.

The present invention solves the above mentioned problem by placing a flexible membrane impermeable to the cooling gas around each compensator of the recirculation duct, a means of detecting a break in a corrugation of a compensator being furthermore provided, this means immediately interrupting the flow of the cooling gas in the circuit for recirculating the latter.

According to one embodiment of the present invention, the flexible membrane impermeable to the cooling gas is made in the form of a textile membrane, for example a membrane made of glass-fiber-reinforced silicone.

According to the invention, the system for detecting a break in a corrugation of the compensator, or a leak in the latter, is achieved by means of a flow of a pressurized inert gas, preferably nitrogen, in the space lying between the compensator and the impermeable flexible membrane which surrounds it, means being furthermore provided for detecting any variation in the pressure of this inert gas as a result of the cooling gas leaking out through the compensator, so as to stop the flow of said gas in the recirculation ducts.

According to one embodiment of the invention, each compensator is provided with a metal casing, in the form of a circular ring surrounding the corrugations of the compensator, this casing being provided with a circular opening closed off by the flexible and impermeable membrane, and it has an inlet and an outlet for the inert gas which is introduced under pressure between the walls of the casing and the compensator, the means for detecting a pressure variation in the inert gas being placed on the casing.

According to the present invention, the means for immediately stopping the flow of the cooling gas in the recirculation ducts for this gas may be of the type described in the patent application filed on the same day as the present application by the same proprietor and entitled: "Improvements made to rapid-cooling ovens for metal strip", i.e. a register system, placed upstream of the exchangers, in the flow area for the rapid-cooling gas, and a system of actuators with a very short response time, i.e. of less than 5 seconds, which control the said register system so as to close the flow area under the control of the detection means.

Other features and advantages of the present invention will emerge from the description given below with reference to the appended drawings which illustrate an example of an embodiment thereof, this example being devoid of any limiting character.

BRIEF DESCRIPTION OF THE DRAWINGS

In the drawings:

FIG. 2 is a diagrammatic representation in axial section of the device forming the subject of the present invention;

FIG. 3 is a plan view showing a compensator provided with the safety device according to the invention; and FIG. 4 is a sectional view of the detail A in FIG. 3.

DETAILED DESCRIPTION

Figure 1:
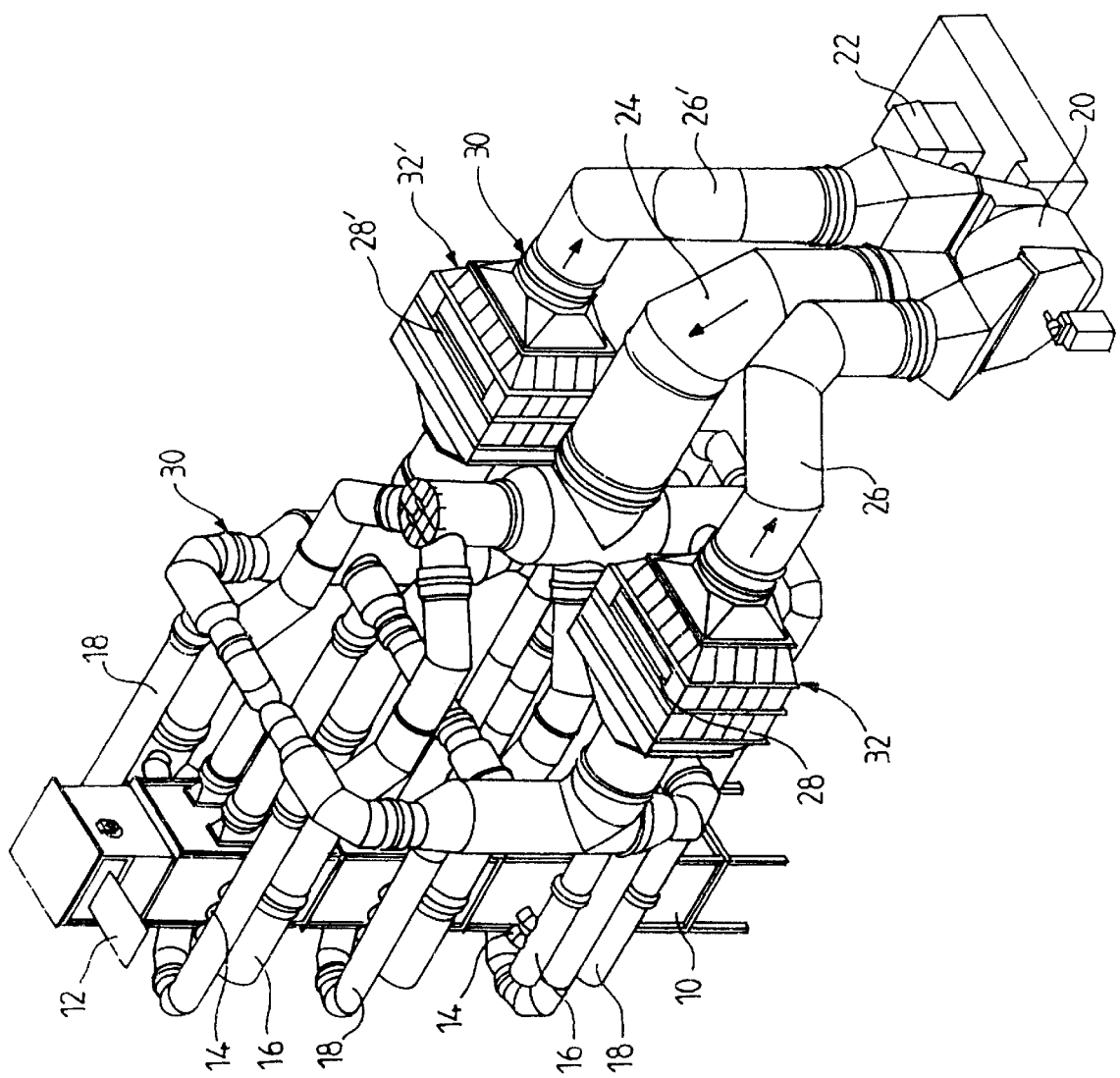
FIG. 1 is a perspective view illustrating an example of an embodiment of a rapid-cooling oven with its ducts for blowing and for recirculating the atmosphere gas, to which oven the present invention may be applied.

Referring to FIG. 1, this shows an overall view of a rapid-cooling oven to which the present invention applies. This cooling oven or chamber generally forms part of a plant comprising a plurality of stations for the treatment of material in strip form, this plant possibly being, for example, of the type described in EP-0,795,616 mentioned above. Running continuously through this oven, denoted by the reference 10, is the metal strip 12, this strip generally coming from other treatment enclosures, for example for heat treatment, temperature-hold treatment, annealing treatment, etc.

The rapid cooling is obtained by spraying onto the strip 12, as a continuous flow, a jet of $N_2/H_2$ atmosphere gas containing, as explained above, a high proportion of hydrogen, which is greater than 15% and which may reach 50%. This atmosphere gas is sprayed onto the side faces of the strip 12 via nozzles, such as 14, supplied by ducts, such as 16, and it is recovered using ducts such as 18 which emerge parallel to the plane of the strip 12 in the rapid-cooling chamber 10. The atmosphere gas is circulated using a fan, such as 20, driven by an electric motor 22, the atmosphere gas being blown in via a manifold duct 24 supplying the ducts 14 while this atmosphere gas is recovered via the manifold ducts 26, 26' supplied by the ducts 18.

In a known manner, the plant furthermore comprises exchangers 28, 28', preferably of the gas/water type, which are housed in enclosures denoted in their entirety by the reference 32, 32', respectively, into which the atmosphere-gas recovery ducts 26, 26' emerge, so as to cool this atmosphere gas after it has flowed through the rapid-cooling chamber 10 and before it is recovered by the fan 20 and blown through the ducts 24 and 16. According to one construction, also known, the various ducts 16, 18, 24, 26, 26' comprise compensators 30 made in the form of a series of corrugations allowing all the ducts to expand.

As was explained above, the objective of the present invention is to increase the safety of the circuit for recirculating the rapid-cooling gas and of the entire plant in which the rapid-cooling oven 10 may be installed, in the event of a break in a corrugation of a compensator such as 30 so as to detect and prevent any ingress of air, i.e. of oxygen, into the circuit, at an underpressure, in which the atmosphere gas (rapid-cooling gas) flows, this gas being composed of a nitrogen/hydrogen mixture in which the hydrogen has a hydrogen content which may be as much as 50%, or any leakage of this atmosphere gas into the environment.

Referring now to FIGS. 2 to 4, these illustrate the means which, according to the invention, provide a solution to the above problems.

According to the invention, a flexible membrane 34, impermeable to the cooling gas, is provided which is placed around each compensator 30 so as to define an enclosure 36 surrounding the corrugations of each compensator 30 placed, as was seen above, on the various ducts for circulating the cooling gas. In FIGS. 2 to 4, the arrow F denotes the direction of flow of this gas.

According to one characteristic of the device forming the subject of the invention, a flow of a pressurized inert gas, especially nitrogen, is maintained in this enclosure 36, as illustrated diagrammatically in FIG. 2. In the event of a leak in the compensator 30, for example when a corrugation of the latter breaks, a variation in the pressure of this inert gas in the enclosure 36 occurs and the invention provides a detector 38 placed on the said enclosure 36 which reacts to this pressure variation in order to stop the recirculation of cooling gas in the ducts 16, 18, 26, 26', 24 of the circuit for recirculating this gas, these ducts being illustrated in FIG. 1.

According to the present invention, the means allowing the recirculation of the cooling gas to be immediately stopped are preferably of the type described in the application filed jointly with the present invention by the present proprietor and entitled: "Improvements made to rapid-cooling ovens for metal strip". As described in this conjointly filed application, these means consist of providing a register system, placed upstream of the exchangers, in the flow area for the cooling gas, and actuators with a very short response time, of less than five seconds, which control the register system in order to close the flow area, under the control of the detector 38.

FIGS. 3 and 4 illustrate a practical embodiment of the device according to the invention. These FIGS. 3 and 4 show that the corrugations of the compensator are surrounded by a metal casing 40 in the form of a circular ring, preferably made of steel, having a system of flanges 42 for fixing the membrane 34. The latter is preferably a textile membrane which may, for example, be made of glass-fiber-reinforced silicone, the silicone providing the gastightness and the glass fibers giving the membrane the necessary mechanical strength. This casing has an inlet 44 and an outlet 46 for the pressurized inert gas, especially nitrogen, which flows through its enclosure 36. The detection system 38 mentioned above is also positioned on the casing.

The casing 40 may be produced so that it can be easily removed. Thus, in the event of a cooling-gas leak, it is possible to carry out work on the defective compensator so as to repair it or replace it.

It will be understood from the above description that the present invention makes it possible, effectively and efficiently, to increase the safety of a rapid-cooling oven employing a cooling gas having a high hydrogen content, by detecting and preventing any ingress of air (i.e. of oxygen) into the circuit, at an underpressure, for recirculating the cooling gas or any leak of the latter into the environment.

Of course, it remains to be stated that the present invention is not limited to the examples of embodiments described and/or shown but that it encompasses all the variants thereof which fall within the context of the scope of the appended claims.

What is claimed is:

1. Rapid-cooling oven, forming part of a plant comprising various treatment stations for the heat treatment of products in strip form, through which a metal strip runs continuously, the rapid cooling being obtained by spraying onto the strip a jet of an atmosphere gas consisting of a nitrogen/hydrogen mixture having a hydrogen content which is between 15%, and 50%, the atmosphere gas being recirculated using a circuit of recirculation ducts comprising compensators made in the form of a series of corrugations allowing all the ducts to expand, at least one fan and at least one gas/water exchanger, wherein a safety device is provided to prevent the ingress of air into the circuit for recirculating the cooling atmosphere gas or any leak of the atmosphere gas into the environment, in the event of a break in a corrugation of a compensator or in the case of a leak from the compensator, said safety device being made in the form of a flexible membrane impermeable to the cooling gas, the membrane being placed around each of the compensators of the recirculation duct, a means being furthermore provided for immediately interrupting the flow of the cooling gas in its recirculation circuit.

2. Oven according to claim 1, wherein the system for detecting a break in a corrugation of the compensator or a leak from the compensator is achieved by means of a flow of a pressurized inert gas through the enclosure lying between the compensator and the flexible, impermeable membrane which surrounds it, means being furthermore provided on this enclosure for detecting any increase in the flow rate of this inert gas as a result of the cooling gas leaking out through the compensator, so as to stop the flow of the gas in the recirculation ducts.

3. Oven according to claim 1 wherein each compensator is provided with a metal casing, in the form of a circular ring surrounding the corrugations of the compensator, this casing being provided with a circular opening closed off by the flexible and impermeable membrane, and it has an inlet and an outlet for the inert gas which is introduced under pressure between the walls of the casing and the compensator, the means for detecting an increase in the flow rate of the inert gas being placed on the casing.

4. Oven according to claim 1, wherein the means allowing the flow of the cooling gas in the ducts for recirculating this rapid-cooling gas to be immediately stopped are made in the form of a register system, placed upstream of the exchangers, in the flow area for the cooling gas, and a system of actuators with a very short response time, of less than 5 seconds, which control the register system so as to close the flow area under the control of the detector.

5. Oven according to claim 1, wherein the membrane is a textile membrane.

6. Oven according to claim 5, wherein the textile membrane is made of glass-fiber-reinforced silicone.

7. In a rapid-cooling oven for the heat treatment of continuously running metal strips, the method of rapid cooling comprising the steps:

spraying onto a strip, a jet of a cooling atmosphere gas having a mixture of nitrogen and hydrogen and having a hydrogen content which is between 15% and 50%;

recirculating the atmosphere gas through a circuit of recirculation ducts including compensators made in the form of a series of corrugations allowing all the ducts to expand;

providing a safety procedure to prevent ingress of air into the circuit for recirculating the cooling atmosphere gas, or any leak of the atmosphere gas into the environment, in the event of a break in a corrugation of a compensator or in the case of a leak from the compensator, the safety procedure including the placement of a flexible membrane, impermeable to the cooling gas, around each of the compensators of the recirculation duct; and immediately interrupting the flow of the cooling gas in its recirculation circuit in the event of a break in a corrugation of a compensator or in the case of a leak from the compensator.

8. The method according to claim 7, together with the detection of a break in a corrugation of the compensator or a leak from the compensator, the detection comprising:

forcing flow of a pressurized inert gas through a space between the compensator and the flexible, impermeable membrane; and detecting any increase in the flow rate of this inert gas as a result of the cooling gas leaking out through the compensator; and stopping the flow of the gas in the recirculation ducts.

9. The method set forth in claim 7 together with the step of providing the compensator with a metal casing in the form of a ring surrounding the corrugations of the compensator;

providing the casing with an opening closed off by the flexible and impermeable membrane;

further providing the casing with an inlet and an outlet for the inert gas which is introduced under pressure between the walls of the casing and the compensator; and detecting the increase in the flow rate of the inert gas on the casing.

10. The method set forth in claim 7 wherein the immediate interruption of the flow of the cooling gas in the ducts is achieved by the steps of:

placing closeable registers in the flow path for the cooling gas; and connecting the registers to actuators with a very short response time, of less than 5 seconds, to close the flow path upon detecting the increase in the flow rate of the inert gas on the casing.

11. The method according to claim 7, wherein the membrane is a textile membrane.

12. The method according to claim 11, wherein the textile membrane is made of glass-fiber-reinforced silicone.

* * * * *